UNITED STATES PATENT OFFICE.

HENRY M. HOYT, OF KNIGHT'S LANDING, CALIFORNIA.

IMPROVEMENT IN MEDICAL COMPOUNDS FOR TREATING COUGHS, COLDS, &c.

Specification forming part of Letters Patent No. 153,078, dated July 14, 1874; application filed June 3, 1874.

*To all whom it may concern:*

Be it known that I, HENRY M. HOYT, of Knight's Landing, in the county of Yolo and State of California, have invented a new and Improved Medical Compound for the Cure of Coughs, Colds, &c.; and I do hereby declare that the following is a full, clear, and exact description of the same.

The invention relates to a compound for coughs and colds, the same being hereinafter fully described and subsequently claimed.

I first mix together equal parts, or four ounces each, of liverwort, hoarhound, and elecampane, steeping them for four hours in two gallons of water, and finally straining off the liquid. Secondly, I macerate four ounces of wild-cherry bark in three pints of water, allowing it to remain for two days, and finally straining off the liquid. Thirdly, I boil one and a half gallon of tar in two gallons of water, allowing it to boil four hours, then get cold, and finally straining off the liquid. I then mix together liquids Nos. 1 and 3, adding fifty-five pounds of crushed sugar and boiling to a sirup. This being strained and allowed to become lukewarm, I add the liquid No. 2—the wild cherry—and four ounces of the tincture of lobelia.

When cold, the product is bottled and ready for use.

In cases of colds that had settled on the lungs, my compound has given relief in a few days, loosening the matter, and, in cases of consumption, the tubercles from the lungs. It is stimulating and healing in its properties, and enables matter to be thrown off without severe fits of coughing or unusual exertion. Moreover, it is entirely without opium or other stupefying ingredients, which merely deaden the sensations and temporarily relieve the patient.

I apply it in doses of one and one-half tablespoonfuls half an hour before eating, and the same just before retiring to bed, this being the dose for an adult, and that for children being proportioned on this basis.

Having thus described my invention, what I claim as new is—

A compound formed of liverwort, hoarhound, elecampane, wild-cherry bark, tar, sugar, and tincture of lobelia, prepared in the manner and proportions specified.

HENRY M. HOYT.

Witnesses:
CHAS. F. REED,
J. D. LANGENOUR.